United States Patent [19]
Tullis

[11] Patent Number: 5,140,537
[45] Date of Patent: Aug. 18, 1992

[54] MODELING A FACTORY WITH HUMAN OPERATORS AND VALIDATING THE MODEL

[75] Inventor: Barclay J. Tullis, Palo Alto, Calif.

[73] Assignee: Hewlett-Packard Company, Palo Alto, Calif.

[21] Appl. No.: 526,352

[22] Filed: May 21, 1990

[51] Int. Cl.⁵ .............................................. G06F 15/46
[52] U.S. Cl. ....................................... 364/578; 364/401
[58] Field of Search ................................ 364/148–151, 364/513, 578, 468, 469, 200, 900, 401, 402, 478, 400

[56] References Cited

U.S. PATENT DOCUMENTS

| | | | |
|---|---|---|---|
| 4,472,770 | 9/1984 | Li | 364/148 |
| 4,512,747 | 4/1985 | Hitchens et al. | 364/578 |
| 4,740,886 | 4/1988 | Tanifuji et al. | 364/148 |
| 4,796,194 | 1/1989 | Atherton | 364/149 |
| 4,887,207 | 12/1989 | Natarajan | 364/468 |
| 4,901,242 | 2/1990 | Kotan | 364/578 |
| 4,967,386 | 10/1990 | Maeda et al. | 364/578 |

OTHER PUBLICATIONS

CACI Products Company; Simfactory; Aug. 1989.

Primary Examiner—Parshotam S. Lall
Assistant Examiner—Michael Zanelli

[57] ABSTRACT

A method of simulating a factory. Characteristics such as job skills of people in the factory are modeled along with characteristics of machines in the factory. Chicken charts and time-state charts are used to validate and verify the model.

15 Claims, 5 Drawing Sheets

MODELING A FACTORY WITH HUMAN OPERATORS AND VALIDATING THE MODEL

Appendix A contains computer listings for the disclosed invention. The listings have not been reproduced, but are available for inspection in the application file.

BACKGROUND

This invention relates generally to computer simulation and more particularly to a method of modeling a factory including human operators and of validating such a model.

Computer models have been used to study factories for the purpose of analyzing their capacities and behaviors such as product throughput, product cycle times, and work-in-process inventory levels. In distinction to queuing theory, discrete event simulation is a preferred approach for dealing with complex factories that involve many products and machines, machine breakdowns, resource limitations and dispatching rules more complex than a first-in, first-out ("FIFO") approach.

These computer models are also used to represent real factories and to run scenarios of where products may be in such a factory at some future time. Some of the models are created with modeling languages having the capability to describe requirements for resources needed to carry out and complete individual activities. But these languages typically have not provided a capability of naturally describing situations in which individual entities having a variety of resources can be captured according to complex algorithms involving the suitability of the entities to meet the resource requirements and at the same time maximize the utilization of scarce resources. In particular, existing models have not been able to account for various human resources that are needed to operate and maintain the equipment in a semiconductor fabrication facility ("fab").

When a discrete event simulation model has been created, the model must be verified and validated. Verification means assuring that there are no inaccurate representations in the elements and structure of the model. Validation means demonstrating that the responses of the model accurately duplicate the real factory and vice versa. Verification and validation have been accomplished by showing that behaviors such as throughput, product cycle times and work-in-process inventory levels have the same steady-state averages and variances in data from the model as they have in data from the real factory.

Discrete event simulations track the sequence of state changes in the modeled factory as a function of time; therefore such simulations inherently generate data that can be used to trace the progress of individual products over time as they progress through the factory. This is demonstrated in some simulations by graphically displaying a representation of the factory that shows objects moving from machine to machine during the course of the simulation horizon. A shortcoming of this graphical approach to inspecting a simulation performance is that slowing the simulation down for human interpretation makes the simulation time unacceptably long for routine analyses.

Verification and validation is a critical aspect of computer factory simulation. Previous work has focused such efforts on inspecting statistics of overall measures like mean and variance of throughput, cycle time, and work-in-process (WIP). Some more recent work, such as that being done at SEMATECH, places a new emphasis on graphical animations that allow the modeler to confirm the accuracy of the model (verification) but that are not well suited to validate a model as complex as required for wafer movement through a semiconductor fabrication facility where the purpose is to focus on throughput, cycle time and WIP. Statistical parameters summarize behaviors down to a few numerical outcomes and, in the process, hide many of the causes of the behavior of the model.

From the foregoing it will be apparent that there is a need for a way to simulate the humans as well as the machines in a factory and to verify and validate such a factory simulation model.

SUMMARY OF THE INVENTION

The present invention provides a method of building a factory simulation model that includes human factors as well as machines in the simulation of the operation of the factory. The invention includes a simple and elegant way to verify and validate the simulation model by comparatively evaluating the form and shape of traces of individual lots as they move through their process sequences over time and by building and inspecting state-segmented bar charts of cumulative state times for data collected during simulation runs and during actual manufacturing in the factory being modeled.

DESCRIPTION OF THE PREFERRED EMBODIMENT

The present invention provides a method of simulating both human factors and machines in a factory and includes a method of verifying and validating the model. Existing factory simulation models have not been able to adequately include various human factors and as complexity increased have been difficult to verify and validate.

Figure 5:
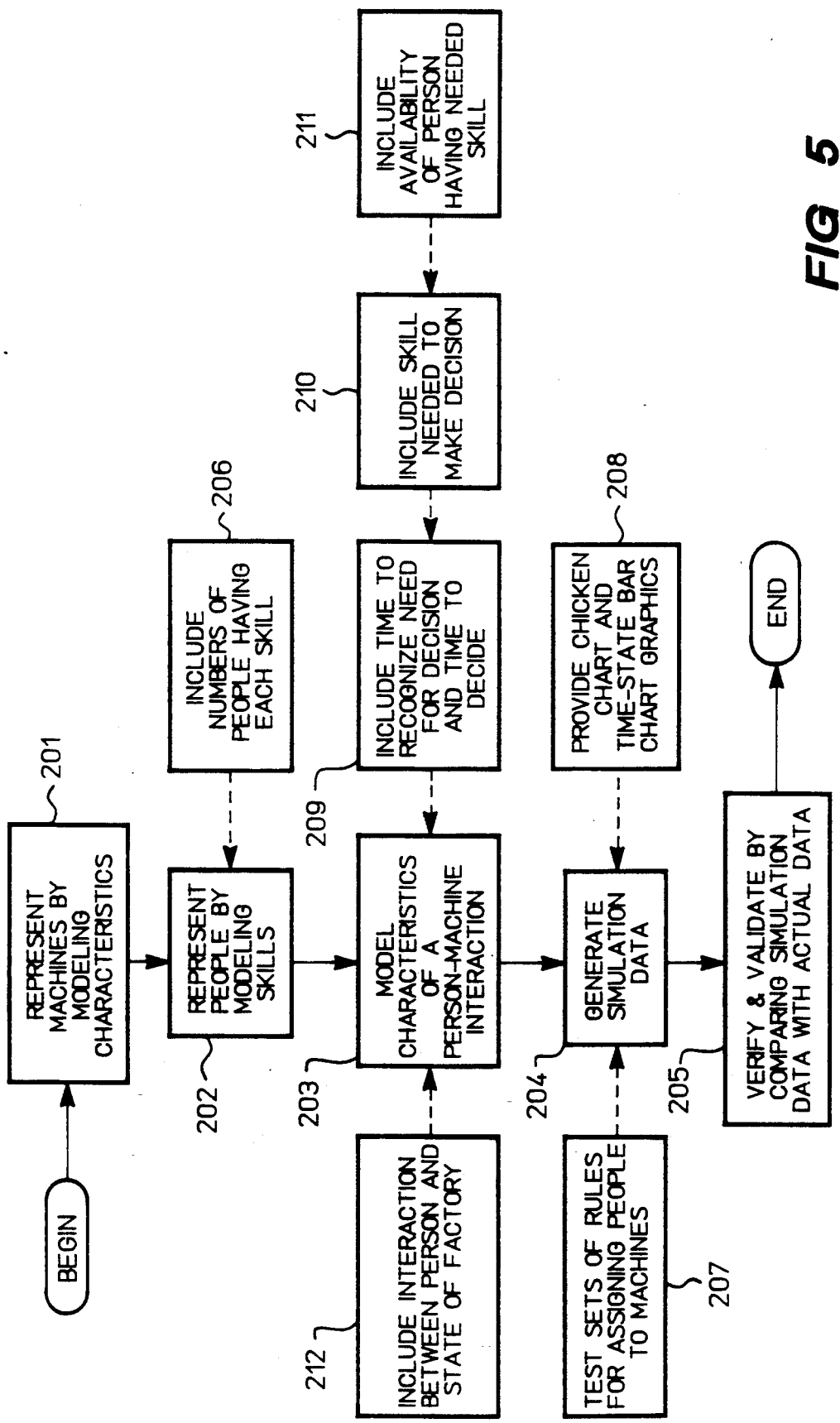
FIG. 5 is a flow chart depicting a preferred embodiment of the method of the invention

In brief, a preferred method of simulating a factory according to the invevtion, as depicted in flow chart form in FIG. 5, includes representing a plurality of machines in a factory by modeling various characteristics of different ones of the machines (block 201); representing a plurality of people in the factory by modeling skills that re required to operate the machines, different ones of the people having different ones of the skills, each skill being processed by at least one of the people (block 202); modeling characteristics of an interaction between one of the people and one of the machines (block 203); and using the model in a computer system to generate simulation data indicative of operation of the factory (block 204). The method preferably includes verifying and validating the model by comparing the simulation data with data compiled from the actual factory being modeled (block 205).

In one embodiment, the step of representing a plurality of people includes representing the number of people who are available at a given time and preferably the number of people having each of a plurality of skills (block 206).

The sep of generating simulation data preferably includes testing alternative sets of rules for assigning various ones of the people to operate various ones of the machines according to which of the people possess which of the skills (block 207), and presenting graphical output in the form of chicken charts and time-state bar charts (block 208).

Modeling a characteristic of an interaction preferably includes estimating the amount of time required for someone to identify a need for a decision and the time required for the decision to be made (block 209), and this in turn preferably includes identifying a skill required to make the decision (block 210) and determining the availability of one of the people having the needed skill (block 211). Also, interactions between the people and a state of the factory as a whole are preferably included in the model (block 212).

The invention will now be discussed in more detail, first with reference to its structure and then with reference to its operation.

STRUCTURE

A discrete event simulation model represents a factory such as a semiconductor fabrication facility ("fab"). Inputs include for example, processes, resale rates, equipment, maintenance and personnel; outputs typically include cycle times, work-in-process ("WIP"), average queues and equipment utilization. In mathematical modeling terms the fab is represented by a network of queues. Workstation in the fab are nodes in the queuing network. Semiconductor wafer lots correspond to material moving through the network along routes specified product recipes. A more detailed description of how fabs are modeled as queuing networks using queuing theory instead of discrete event simulation is provided in Chen, Hong, J. Michael Harrison, Avi Mandelbaum, Ann van Ackere, and Lawrence M. Wein, "Queuing Network Models of Semiconductor Wafer Fabrication", Stanford University Center for Integrated Systems, Stanford CA, Tech Rep, 1986.

The overall fab load can be controlled either by varying the rate at which new lots are released into the fab or by defining a maximum WIP level for the fab. WIP is a count of how many lots are in the fab at any one time. In models that feature more than one type of product, both the lot start rate and the maximum WIP can be set for each product type. The initial fab inventory level, and the initial state of equipment, such as available or down for qualification, can also be specified.

For each step in its recipe, a lot is processed at the specified equipment for a fixed period of time. In addition, random delays are modeled between some recipe steps. Equipment breakdown and repair times are modeled as exponential random variables. At each equipment, preventive maintenance can take place with a specified frequency for a fixed period of time. The fab model features,) very realistic representations of workstations (FIG. 5, block 201), product recipes, process step parameters and fab staffing.

Each workstation in the fab is assigned to a work area within the fab, such as the lithography area or the diffusion area. A workstation is defined as a group of one or more similar pieces of equipment. A plurality of workstations (for example, sixty) are modeled, some with more than one equipment assigned to them. Equipment reliability parameters such as mean time between failure and mean time to repair are specified for each piece of equipment and preventive maintenance schedules are specified for each workstation. Reliability parameters are calculated from historical data which are taken from the fab's tracking system, while preventive maintenance schedules are obtained directly from fab supervisors and equipment engineers. Data for a typical workstation are provided in Table 1.

TABLE 1

| WORK STN | WORK AREA | EQUIP Name | MTBF hrs | MTTR hrs | PM interval hrs | PM length min |
|---|---|---|---|---|---|---|
| 1 | DIFF | Tube1 | 500 | 100 | 48 | 63 |
|   |      | Tube2 | 600 | 80  | 48 | 63 |

Process recipes are available directly from the lot tracking system. Recipe step parameters include, for example, load size, setup time, load time, process time, unload time, and required technician time.

Historical records of staffing may be used to determine staff levels to include in the model. Operators are categorized, for example, by work area, shift, and skills (FIG. 5, block 202). In a work area some equipment may require specially trained operators while other equipment can be run by anyone in that area or even anyone in the factory. Some employees, therefore, are assigned special skills which enable them to operate specialized equipment, while other employees are relatively unskilled and therefore only able to operate equipment for which no special skills are required (block 206). A representation of a skill table for a work shift and a work area is shown in Table 2.

TABLE 2

| | WORK AREA A -- 1st SHIFT | | | |
|---|---|---|---|---|
| OPERATOR | EQUIP1 | EQUIP2 | EQUIP3 | EQUIP4 |
| Peter | X | X | | |
| Mary | X | | X | |
| Paul | X | | X | X |
| Susan | | | X | |
| CatA (3 ea) | | X | | |
| CatB (5 ea) | X | X | | |

Multiple runs are preferably made with long horizons (e.g., 2 years) to obtain and assure statistical significance in modeling.

Results may be presented, for example, by plotting mean cycle time against WIP under various sets of equipment and staffing conditions and under various scheduling rules such as first-in-first-out, shortest-processing-time-next-station, shortest-total-remaining-processing-time-in-fab, least-lots-next-queue, minimum remaining time to due date divided by remaining processing time, and minimum remaining time to due date. Such data may be presented in bar chart form, for example by showing the effect of eliminating unscheduled maintenance on any one of several different machines on overall cycle time, or the effect of increasing staffing in selected areas to see which increase would best improve cycle time, or the like.

In moving product through a semiconductor factory, people with multiple skills are needed. People are needed to operate, maintain and qualify equipment and to inspect and move the product. In addition, people make decisions that determine the sequence of their own activities, the activities of other people, and the activities of machines. The interactions of these people with product, with equipment (FIG. 5, block 203), with factory states and with each other is thus a very important aspect of the dynamics of a factory. Few industries can afford to keep sufficient numbers of skilled people available such that the cycle time with which product moves through the factory is not in some way dependent upon the number and kind of people actively employed in the factory at a given time.

When people have multiple skills, it is useful to rank those skills to enable intelligent deployment of the people with those skills. The rankings of these individual skills are then used to control which activity a given person is directed to perform if more than one activity requiring various ones of the skills possessed by that person is waiting for an operator. In this way the model can dynamically control the actual sequence of activities that each person will perform, allowing the model user to test alternatives in rules that govern the choices of what an operator does next (FIG. 5, block 207). One objective of such a rule is to assure that a person having a scarce skill is not kept busy performing tasks requiring less scarce skills. The choices of which skills to use are modeled as stochastic or algorithmic as desired.

Modeling a real-world factory requires including in the model the interactions of people not only with product and machines but also with the states of the factor (block 212). In the course of events in a factory, people make decisions that affect the progress of the work-in-process. Thus the model includes time required to identify a need for any decision that would delay the manufacturing process and time required to make such decision (block 207). These decision-making activities are preferably modeled as activities that require the availability of a person having an appropriate skill for making the decision (blocks 210 and 211). If a.1 such people are busy, a delay occurs. The duration of any such delays and decision-making processes are modeled deterministically, stochastically or algorithmically as desired. Thus the model includes interactions between people and states of the factory as well as interactions between people and product and between people and machines.

The model preferably includes descriptions of the following:

(a) activities representing decision points within the factory and as steps in process sequences;
(b) which activities require the participation of a person;
(c) during which portions of such an activity is a person required;
(d) how many people are required for each activity;
(e) rules determining the outcome of any contention between activities for a given skilled person;
(f) rules determining the order in which people having different skills are to be utilized if a plurality of skills possessed by different people are needed; and
(g) rules determining which of a plurality of people each having one needed skill will be utilized.

TABLE 3

SKILL TABLE (First Shift)

| Operator | E-Rank | Equip#1 O-Rank | O-Util | E-Rank | Equip#2 O-Rank | O-Util | Total Util | Hrs till Avail | Hrs to Shift End |
|---|---|---|---|---|---|---|---|---|---|
| Mary | 1 | 1 | .19 | | | | .19 | .2 | .3 |
| Peter | 1 | 2 | .38 | 2 | 1 | .05 | .43 | 0 | .3 |
| Paul | | | | 1 | 1 | .37 | .37 | 2.1 | 3.5 |
| GroupA | 1 | 3 | .03 | 2 | 2 | .23 | .26 | 0 | .3 |

TABLE 4

Selection of an Operator for Each Idle and Available Equipment that has Work Waiting and Ready Address Next in List of Idle and Available Equipment, which has Work Waiting, in an order such as one of the following:
a) in Order of Descending Values of Equipment Utilizations,
b) in Order of Ascending Values of Average E-Rankings,
c) in Order of Those at Which Work Has Been Waiting Longest
d) in Order of Those Showing Fewest Available and Suitable Skilled Operators at Other Equipments, or
e) in Any Other Order as Prescribed by the User

↓

Subset Operators to Those with O-Ranks in Applicable Equipment Column of the Skill Table

↓

Further Subset to Those Not Busy or Those About to be Not Busy

↓

Further Subset to Those with Sufficient Time Left on the Shift to Complete the Work

↓

Choose One Operator (or More if Required and Available), Using a Criterion Such as One of the Following:
a) Choose Randomly Regardless of O-Rank
b) Choose Randomly from Those with Low Utilization,
c) Choose by Lowest O-Rank Value, or Randomly from Those with Low O-Rank Values, or
d) If 2 or More with Same Low O-Rank Value, Choose the One with Lowest E-Rank Value

↓

If no Operator Passed the Selection Process, Lots Waiting for This Equipment and Operator Must Continue to Wait

TABLE 5

Decision and Response Delays

Job Lot Arrives from Previous Step
↓

TABLE 5-continued
Decision and Response Delays

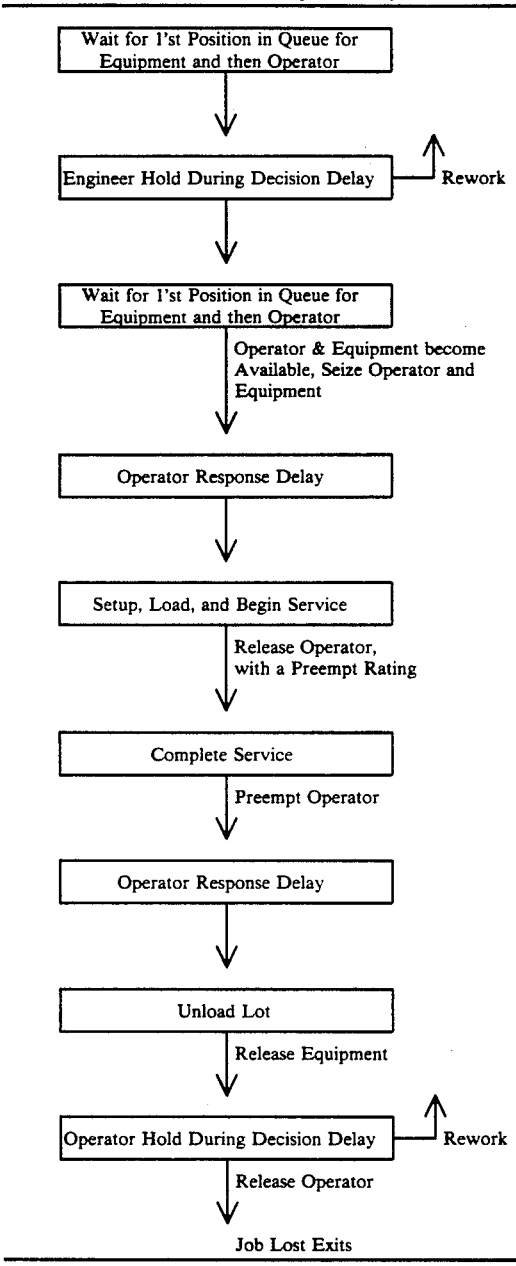

Table 3 is a representation of a skill table as might be implemented in discrete event simulation software. Such a table can be used in selecting an operator to be seized by a machine requiring an operator to load, unload, or run a product piece, lot, or batch through the machine. Separate tables can be used for selecting people for scheduled or unscheduled maintenance work, set-up, or qualification of machines or for selecting people for decisions, if different people are required.

This example matrix of operator identities and equipment identities may be defined by work period or shift. Names of workstations or any other groups of equipment requiring the same operator skills might also appear as column-group titles where an equipment name is shown in this example. (Workstations are defined as specific sets of equipment capable of performing identical tasks (operations) and sharing a common queue for work waiting.)

"E-Ranks" are given to equipment which an operator (or group such as GroupA) can operate and are for the purpose of selecting which equipment an operator will work on next when more than one equipment is waiting for an operator. "O-Ranks" are given to operators which can work on a given equipment (or group) and are for the purpose of selecting which operator will be seized to operate a machine when more than one operator is available (or may soon become available). Low ranks mean high priority in the examples presented here.

"O-Utilizations" are the fractional part of an operator's workshift spent on operating associated piece(s) of equipment. In the case of an equipment group and/or an operator group, this fraction is averaged per operator and equipment. Additional columns with ranks characterizing parameters/measures might be added to the columns of any equipment, for example to express the efficiencies of operators at that machine; and then that additional information could be used in the selection of an operator to operate that machine.

"Total Utilization" is the total fractional part of an operator's workshift spent operating machines.

"Hrs till Avail" is the length of time until a currently busy operator is expected to be done operating a machine; if the operator entry is that of a group, then this is the time until the first of these operators is available. "Hrs till Avail" can be set at the beginning of a shift to a positive value to indicate that that operator or group doesn't start work until later in the shift.

"Hrs to Shift End" is the length of time until an operator's shift is over. If this remains larger than zero at the end of the shift, that operator is presumed to be working into the next shift, and this time is to be carried over into the next shift.

Equipment in any operator row can have common E-Ranks or no E-Rank at all. Operators in any equipment column of O-Ranks can also have common O-Ranks or no O-Rank at all. O-Ranks and E-Ranks appear in pairs only.

Table 4 shows the general process of determining which operator is to be seized by equipment with work waiting to be serviced (product waiting to be processed).

Table 5 shows the sequence of durations which product might experience while waiting to be processed and being processed by a machine. In addition, these durations include delays for decision making by personnel involved in the manufacture of the product, as well as delays incurred for operators to respond when finding out that product is waiting to be serviced (including loading or unloading the product at the machine).

OPERATION

When a specific product lot awaits service at an equipment (or workstation) for a specific operation, a choice needs to be made of which operator(s) to seize for carrying out the required action. This choice can be made from all of the operators, from only the operators not currently busy, from the operators (or available operators) defined to work primarily within a limited equipment group (comprising a subset of machines in the plant), and/or from those operators defined to have suitable skills or other rankings. In any case, the selection can be made randomly, in round-robin or other sequential fashion, or by static or dynamic ranking parameters.

The choice of which selection criteria to use will often be guided by an objective. One example might be to distribute workload fairly among operators. To distribute workload, the operator with the lowest utilization record for the shift in progress might be picked, or a random selection might be made among operators having less than a threshold value of operator utilization. As a second example, suppose the objective was to maximize the probability of operators being available when needed. This might be done by choosing a suitably skilled operator who is least likely to be needed by other equipment, i.e. who has E-Ranks for the fewest other equipment. As a third example, operators might be chosen to work on the equipment where they are most needed to reduce bottlenecks, for instance, by giving lower E-Ranks to machines with high equipment utilization (equipment utilizations are not shown in the Skill Table). E-ranks could be updated dynamically to be in inverse proportion to recent equipment utilizations or to long time averages.

One could also apply skill mapping to the running of operations which don't require equipment, such as decision making at product inspection and evaluation steps in the manufacturing sequences. In this case the equipment column groups in the Skill Table could be substituted with categories of decision-making skill requirements. In a similar manner, operators could be associated with having permission to work only on certain products or even only on certain recipe segments, by including groups of columns with ranks for these products or recipe segments.

As suggested above under "Structure", in describing potential additional columns with each equipment (or other column group heading), operator efficiencies might be included to further enhance the variety of operator selection rules possible.

Incidentally, the ranking of resources in general, not just people skills, can be handled by methods identical or similar to the above descriptions. For instance, machines themselves can be treated as resources required to accomplish an operation on a product. Then machines could appear in the rows of a ranking table (matrix) like the operators in rows of the skill table. Product types could appear as the column groups, with individual columns of ranks for how the quality of each product varies from machine to machine and how the quality of each machine affects different products. Of course this example makes sense only if product quality is an independent function of product and of machine, just as the best choice of operator at a machine might be an independent function of how skilled an operator is to work that machine (O-Rank) and how many other machines may also require that same operator (E-Rank). The objective for treating machines as resources in this way might be to simulate the quality distribution of a product exiting a recipe involving more than one machine.

Whether or not people are considered a resource to the carrying out of decisions, making decisions made at product inspection steps usually causes the progress of the product to be delayed. Examples of such delays are shown in Table 5 where product is shown a) delayed when an engineer decides to put the product lot on hold from an equipment queue and b) delayed when an operator questions the quality of the product immediately after unloading it from the equipment. In the first case (a), the equipment operator is not required, but an engineer, supervisor, or manager may be required. In the second case, the equipment operator's presence is shown as being required. Table 5 also illustrates examples of product delays that can occur if an operator is not available when a product reaches certain steps in its sequence of activities at one equipment site. And Table 5 shows how the product can be held up waiting for an operator to respond when needed to complete specific actions already begun at the equipment. These operator response times might be used to represent the time it takes operators to travel from the equipment they worked on last. All the times shown in Table 5 can be modeled as stochastic.

It not only provides more accurate simulations to separately specify each independent cause of product delay, but it is most convenient for the modeler who must parameterize or otherwise quantify these delays to deal with each of them separately. Characterizing distributions for combined effects is harder to verify than characterizing each independent effect separately.

This invention teaches the use of a flexible ranking system for selection of operators to run machines, do inspections, and make decisions. Only by including people defined to work on specified shifts, and tracking their utilizations and how much time they have left on a current machine operation or left in the shift, can a discrete event simulation model permit realistic modeling of product cycle times through waiting queues and machines, unless people are never in short supply.

Verification and validation of a factory model are accomplished by dynamic graphical presentations (FIG. 5, block 208) of how products move through the shop. Traditional methods of accomplishing this are inadequate for semiconductor fab shops containing hundreds of major items of equipment and hundreds of processes each including as many as 350 process steps.

FIGS. and 2 depict typical lot progression charts according to the invention. These charts have been named "chicken charts" because the graphed lines resemble the scratches made by chickens searching for food in a farmyard.

Figure 1:
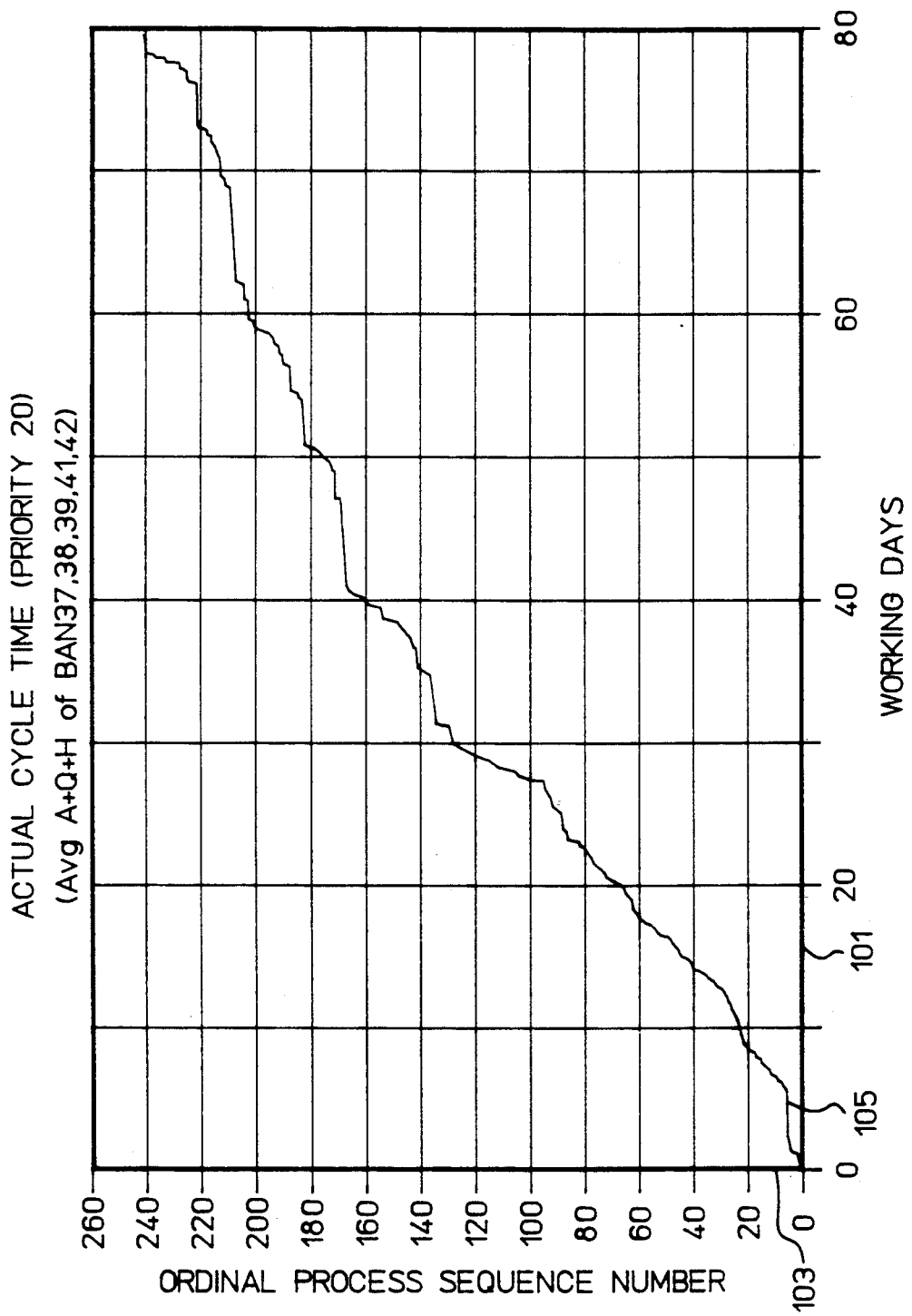
FIG. 1 depicts a typical chicken chart for showing the progress of a lot moving through process sequence steps over time and validating a simulation model according to the invention.

FIG. 1 shows the progress of a single lot through various process sequences in a factory. Time in working days is represented on a time axis (the horizontal axis, or abscissa) 101. Process sequence numbers are represented on a process sequence axis (the vertical axis, or ordinate) 103. A trace 105 represents the path along these coordinate axes of a product lot moving through the factory.

Figure 2:
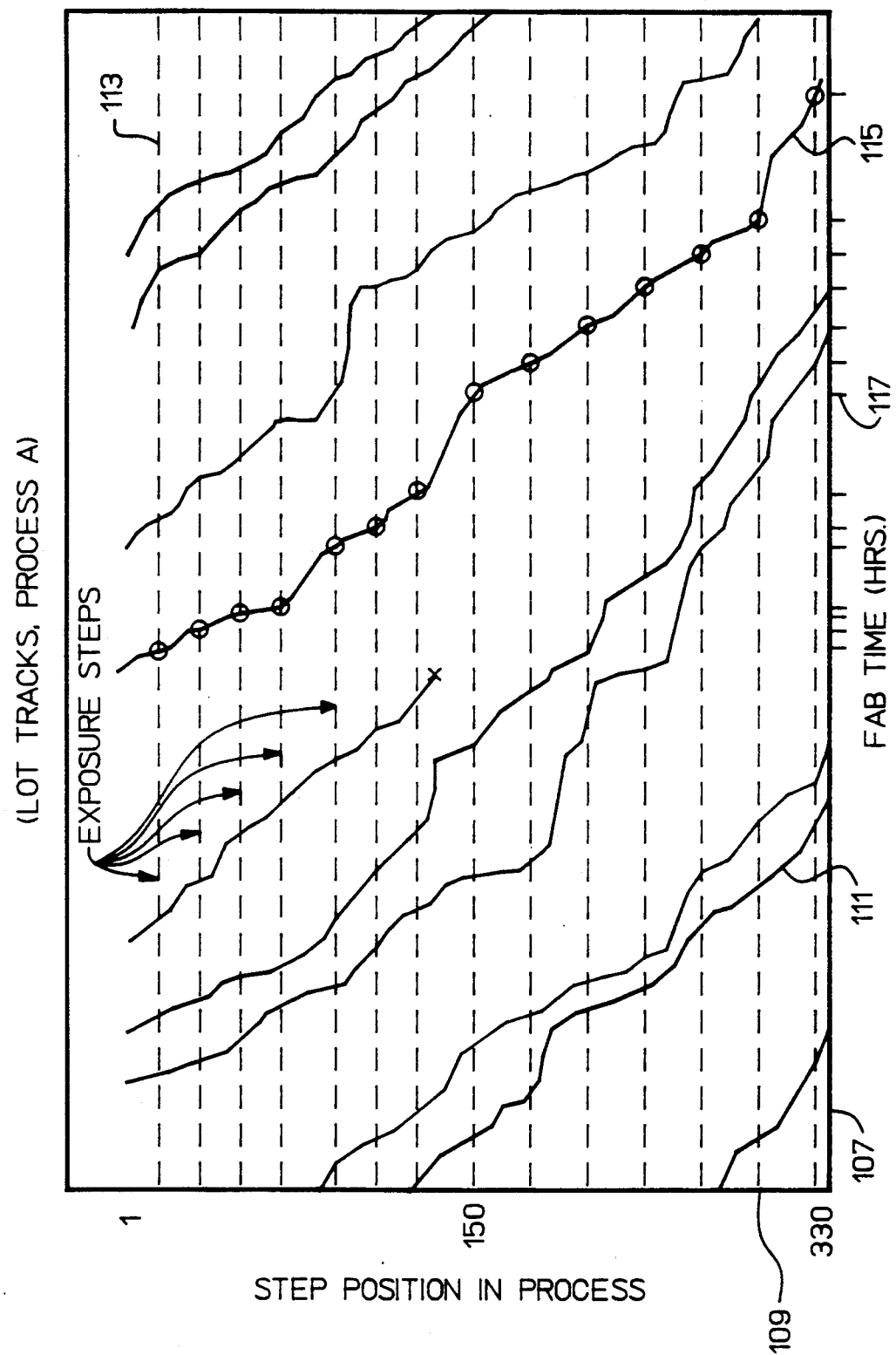
FIG. 2 is similar to FIG. 1 except that sequence step numbers increase moving down the vertical axis and the progress of several lots is shown on a single chart.

FIG. 2 shows the progress of a plurality of lots through various process sequences. As time increases to the right along a time axis (the horizontal axis, or abscissa) 107, lots travel "down" on the chart through their sequences of process steps indicated on the process sequence axis (the vertical axis, or ordinate) 109. Each of a plurality of traces such as a trace 111 represents the progress of one of the lots.

It will be noted that in FIG. 1 the number of the process step increases going up the vertical axis, whereas in FIG. 2 the number of the process step increases going down the vertical axis. Either an increasing-up or an increasing-down graphical approach may be used as desired.

If all the lots selected for presentation in a chicken chart such as the one depicted in FIG. 2 are running the same process sequence, then any vertical position represents the same process step for all lots. Horizontal dashed lines such as a line 113 paralleling the abscissa 107 are drawn at all the repeated uses of one particular process step in the overall process, for example an exposure step in a lithography area. Circles drawn at intersections of a lot trace such as a trace 115 with these horizontal lines shows a viewer when the lot represented by the trace 115 made its repeated visits to the exposure step. Tick marks such as a mark 117 on the abscissa 107 highlight these exposure events and permit assessing the distribution of interarrival times for this lot. Tick marks drawn in a similar fashion for all the lots together give a clear indication of lot interarrival rates at the exposure workstation. Chicken charts therefore provide visual histories of the dynamics of lots moving through the factory. Comparing a chicken chart drawn from real factory history against one drawn from a simulation according to the model being validated (FIG. 5, block 205) reveals much about the accuracy of the model.

Figure 3:
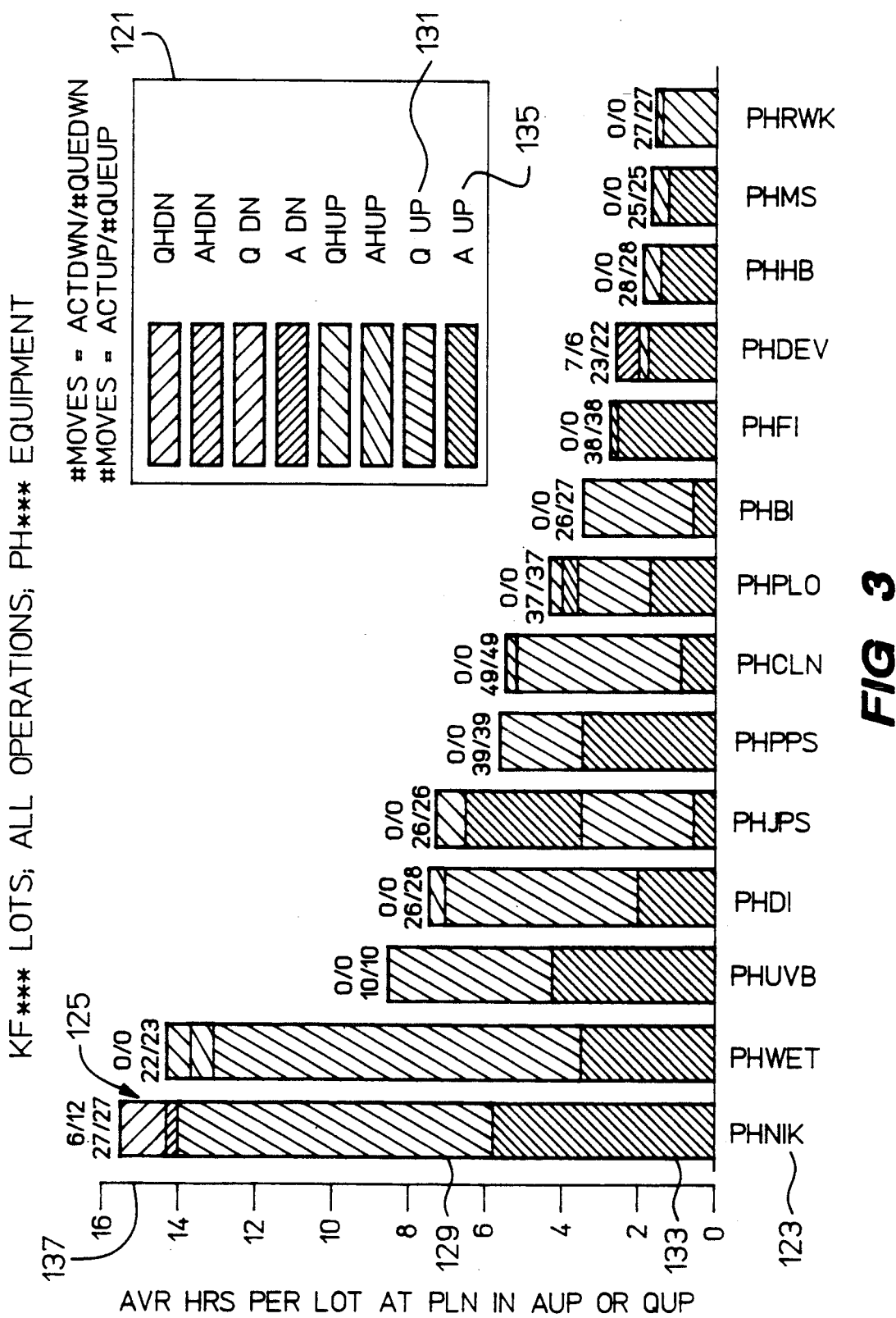
FIG. 3 shows a state-time chart for evaluating cumulative state times and validating a simulation model according to the invention.

A typical state-time chart for evaluating cumulative state times and validating a simulation model is shown in FIG. 3. A legend 121 describes the contents of the chart. Labels beneath the bars such as a label "PHNIK" 123 beneath a bar 125 represent names of various items of equipment. Similar charts depicting times associated with process steps, process segments, skills, individual operators, groups of operators, maintenance people and the like rather than items of equipment are prepared as desired.

Segments of the bars correspond with various states such as a segment 129 of the bar 125 which corresponds with a waiting-for-an-active-machine state, abbreviated as "Q UP" 131 in the legend 121. Other segments include a segment 133 designating a service or active state, abbreviated "A UP" 135 in the legend 121. The designation "UP" in various abbreviations in the legend 121 indicates that a machine is functional; the designation "DOWN" indicates that the machine is awaiting maintenance; the designation "H" indicates a human-directed hold; "Q" represents a state of waiting or being in a queue; "A" represents active or being serviced; and so forth. Time is represented on the ordinate 137 which may be normalized by average factory cycle times, the number of process steps, and the like.

Figure 4:
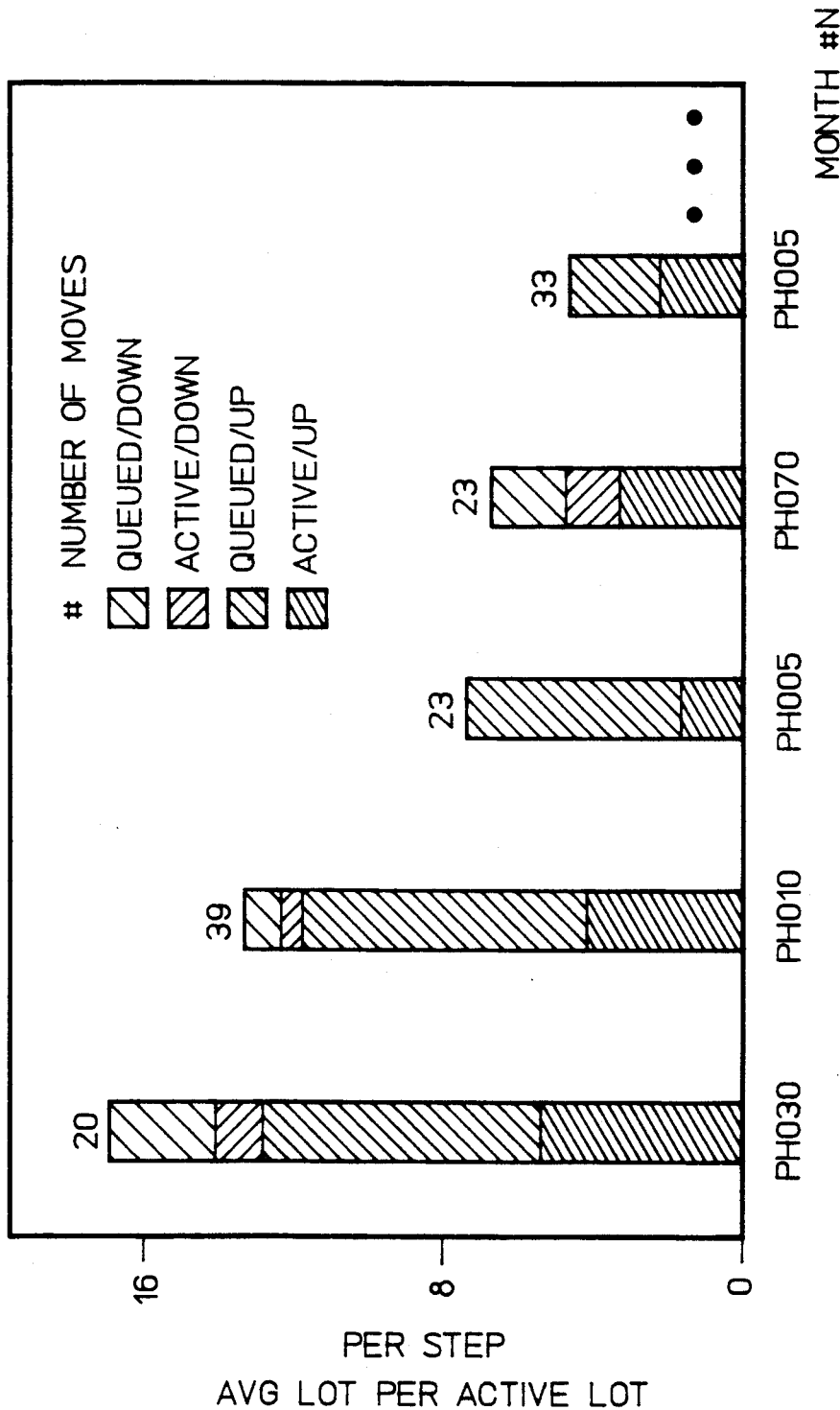
FIG. 4 is similar to FIG. 3 but shows a smaller number of states.

Another time-state chart showing a smaller number of states is depicted in FIG. 4.

The height of a bar in a time-state chart represents the average time a lot spends at that equipment during a fixed time period (for example, one month) for each visit the lot makes to that equipment, with instance counts shown at the top of the bar when appropriate. The components of a bar represent portions of the overall average time which lots spend in various states. The states shown in FIG. 4 are four combinations of two equipment states (UP and DOWN) and two lot states (ACTIVE and QUEUED). Many more states than four are typically treated; several states are usually defined for each of the various reasons an item of equipment may be down or otherwise unavailable and lots generally have states corresponding with both engineering and operator holds.

Bars are chosen to represent either individuals or classes, as desired. For example, an individual represented by a bar might be a machine, a product, or even a human operator; a class might comprise items of equipment that make up a workstation, a group of lots such as a product group or a process group, a segment of process steps, human operators having certain common characteristics such as skill at working a certain machine, and the like. If desired, bars are constructed according to variances in times rather than average times to provide additional comparison between data provided by the simulation model being validated and that provided by the real factory. Similarly, medians or other statistics on state times may also be used.

The tools of this invention are implemented by enhancing existing simulation code to capture generated data on state categories, their durations, and their sequence.

Chicken charts and state-time charts have the advantage of displaying much information in single views which span the entire scope of the processes and equipment in the model. Essentially these charts transform the operating space from the geometry and time of the real fab, which is overly high in information content and difficult to mentally or visually scope, to a simpler geometry of state spaces and time. A human validator is then able to compare nuances of detail throughout space and time and compare statistical outcomes in a visual way for very many details in a few highly structured views.

Appendix A, incorporated herein by this reference, provides a listing of three program files that are preferably used to generate state-time charts according to the invention. (See, generally, FIG. 5, blocks 204 and 208). These program files are written in the "S" language that runs under the UNIX (trademark of ATT) operating system. The "S" language is explained in Becker, Richard A., John M. Chambers and Allan R. Wilks, *The New S Language—a Programming Environment for Data Analysis and Grahics*, Wadsworth & Brooks/Cole, Pacific Grove, CA, 1988.

The three program files include the following:

(i) statpareto (this program generates state-time charts from data brought into the "S" environment by the prepareto program);

(ii) prepareto (this program prepares data for the statpareto program); and (iii) master.des (this file contains data descriptions needed by the prepareto program).

The files statpareto and prepareto contain programs with the same names, designed to be used as macros in the "S" environment, an environment for data analysis and graphics. The master.des file is a data file used by the prepareto program (macro). To use these programs, one would first run the prepareto(argl) program in order to bring data from a history of the real fab states or a history of the states generated by a simulation run into the "S" environment (file directory).

Then one would run the statpareato (arg1, arg2, arg3, arg4, arg5, arg6, arg7, arg8) program to calculate the time spent in various states and average them over instances of that state and then plot the results as paretoed and segmented bars. Note that the argument to the prepareto program should be a file name in the form "mmmyy" where the double quotes are used and where mmmyy is replaced by the first three letters of a month for a month's worth of data in the year ending in yy, if the data file mmmyy is a file of state records throughout one month of real time for a real fab or simulated time for a simulated fab. The same argument is given as the first argument to the statpareto program, but without the quotes.

The arguments arg2, arg3, and arg4 can each be given in any of four forms, either 1) as a name of a list of specific names, 2) as "all" in quotes to select all names, 3) as a quoted single first character of a group of names all of which uniquely begin characters of a group of name all of which uniquely begin with this pair of letters. These three arguments are respectively to select a subset of lots, operations, or equipment (where an operation is defined as a specific task carried out on a lot at a piece of equipment).

The arguments arg5 and arg6 are respectively the names of a list of process step numbers to be used as process segment breakpoints delimiting short and contiguous process sequences each of which would be analyzed and plotted as individual bars on the plot.

Argument arg7 is a number 1,2,3, or 4 to select whether the bars on the plot should be correponding to lots, operations, equipment, or process segments, respectively. If arg7 is not equal to 4, then arguments arg5 and arg6 can be left blank. If arg7 is equal to 4, then the bars will be ordered in process flow sequence and not paretoed. Argment arg8 is optional and would be a quoted character string to use as the plot title instead of the default title which itself states the lot, operation, and equipment selections made with the arguments arg2, arg3, and arg4. Custom titles are usually passed as argument arg8 when arg7 is equal to 4 to select a plot of states by process segments.

Each execution of statpareto with a set of argment values generates a single plot.

Although specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

I claim:

1. A method of simulating a factory, the method comprising:
   representing a plurality of machines in a factory by modeling various characteristics of different ones of the machines;
   representing a plurality of people in the factory by modeling skills that re required to operate the machines, different ones of the people having different ones of the skills, each skill being possessed by at lest one of the people;
   modeling characteristics of an interaction between one of the people and one of the machines; and
   using the model in a computer system to generate simulation data indicative of operation of the factory.

2. A method according to claim 1 wherewith generated data are depicted in the form of a chicken chart.

3. A method according to claim 1 wherein the generated data are depicted in the form of a time-state bar chart.

4. A method according to claim 1 and further comprising verifying and validating the model by comparing the simulation data generated by the model with data compiled from the actual factory being model.

5. A method according to claim 1 wherein representing a plurality of people comprises representing the quantity of people who are available at a given time.

6. A method according to claim 5 wherein representing the quantity of people comprises representing the quantities of people having each of a plurality of skills.

7. a method according to claim 1 wherein generating simulation data comprises testing alternative sets of rules for assigning various ones of the people to operate various ones of the machines according to which of the people posses which of the skills.

8. A method according to claim 7 wherein one of the rules comprises a requirement that each person work approximately the same amount of time as each other person during a shift.

9. A method according to claim 7 wherein one of the rules comprises a requirement that people be assigned to machines having higher utilization rates before being assigned to other machines.

10. A method according to claim 1 wherein modeling characteristics of an interaction comprises estimating the amount of item required for one of the people to identify a need for a decision and the time required for the decision to be made.

11. A method according to claim 10 wherein estimating the time required for making the decision comprises identifying a skill required to make the decision and determining the availability of one o the people having said skill.

12. A method according to claim 1 wherein modeling characteristics of an interaction comprises modeling an interaction between one of the people and a state of the factory.

13. A method according to claim 1 wherein modeling skills comprises ranking the skills possessed by various ones o the people and using the rankings to dynamically determine which activities each of the people will perform.

14. A method according t claim 1 wherein representing a plurality of people compresses keeping a record of utilization o various ones of the people as a function of time.

15. A method according to claim 14 wherein keeping a record of utilization comprises keeping a record of how much time each of the people has remaining on a current shift.

* * * * *